United States Patent [19]
Karl et al.

[11] Patent Number: 6,005,044
[45] Date of Patent: Dec. 21, 1999

[54] COATING COMPOSITION APPLIED TO A SUBSTRATE AND CONTAINING ULTRA-FINE TIO$_2$ AND METHODS OF MAKING AND USING SAME

[75] Inventors: Wolf-Ruediger Karl, Duisberg; Jochen Winkler, Rheurdt, both of Germany

[73] Assignee: Metallgesellschaft AG, Frankfurt am Main, Germany

[21] Appl. No.: 08/616,970

[22] Filed: Mar. 18, 1996

Related U.S. Application Data

[63] Continuation-in-part of application No. 08/268,108, Jul. 6, 1994, abandoned.

[30] Foreign Application Priority Data

Jul. 13, 1993 [DE] Germany .................. 43 34 372

[51] Int. Cl.$^6$ ...................................... C08K 3/22
[52] U.S. Cl. .................... 524/497; 428/328; 428/458; 428/461; 427/376.2; 427/376.3; 427/376.4; 427/376.5; 427/388.1; 427/388.2; 427/388.3; 427/388.5
[58] Field of Search .................. 428/328, 458, 428/461; 524/497; 427/376.2, 376.3, 376.4, 376.5, 388.1, 388.2, 388.3, 388.5

[56] References Cited

U.S. PATENT DOCUMENTS

| | | | |
|---|---|---|---|
| 4,937,274 | 6/1990 | Arima et al. | 523/220 |
| 5,232,971 | 8/1993 | Nomura et al. | 524/424 |

FOREIGN PATENT DOCUMENTS

| | | |
|---|---|---|
| 0270472 | 6/1988 | European Pat. Off. |
| 60-118766 | 6/1985 | Japan . |

OTHER PUBLICATIONS

The Use of Fine Particle Titanium Dioxide for . . . Blackburn, Meldrum & Clayton, 1991.
Einsatz Von Ultrafeinem Titandioxid in Metalleffekt–Lackierungen. Keetler & Richter, 1992.
Pigment Handbook, vol. I, Lewis 1988.
Product information sheets of synres International BV, Jan. 1980.
The Lighter Side of TiO$_2$ Vesa P.S. Judin, 1993.
Seeing Double, Joe Schrantz Apr. 91.
Optical Theory of Titanium Dioxide E.I. du Pont de Nemours 1983.
Finntitan Quality Titanium Dioxide Pigments, Tuivo Evilampi 1990 Fintitan Information Sheet.

*Primary Examiner*—Frederick Krass
*Attorney, Agent, or Firm*—Michael J. Striker

[57] ABSTRACT

A coating composition is described which is applied to a substrate and contains ultra-fine TiO$_2$. This coating composition contains from 0.5 to 30.0% by volume of colored pigment and/or carbon black, from 55.0 to 98.5% by volume binder solids and from 0.3 to 15% by volume ultra-fine TiO$_2$ having a particle size of 5 to 40 nm. It has a high total reflectance and intensive depth of color. Furthermore, a method of making the coating composition is described. Finally, the use of the coating composition as a finishing lacquer for motor vehicles, industrial coating, printing ink, coil coating, package coating, plastic coating and decorative paint, and also as paint, is described.

17 Claims, 2 Drawing Sheets

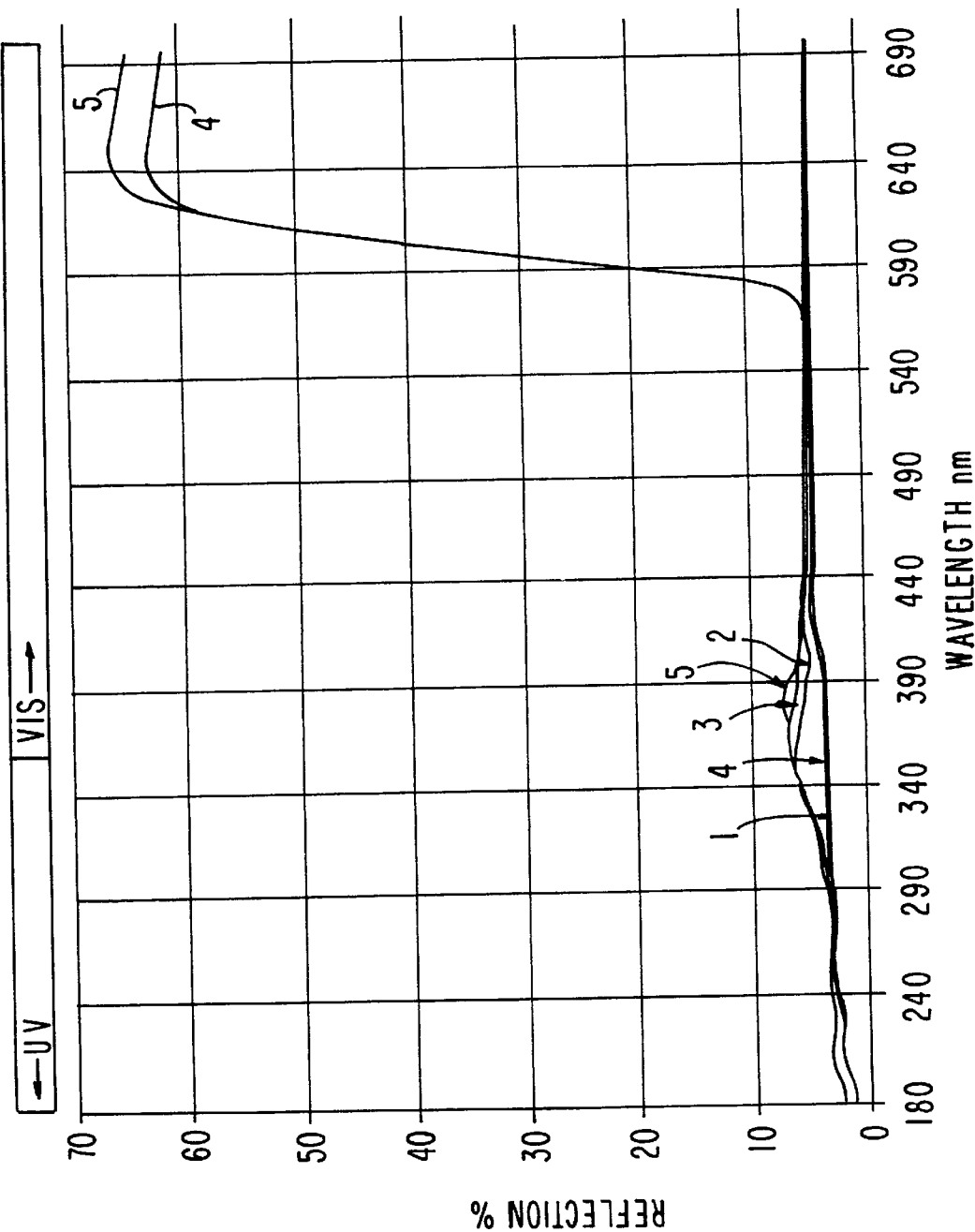

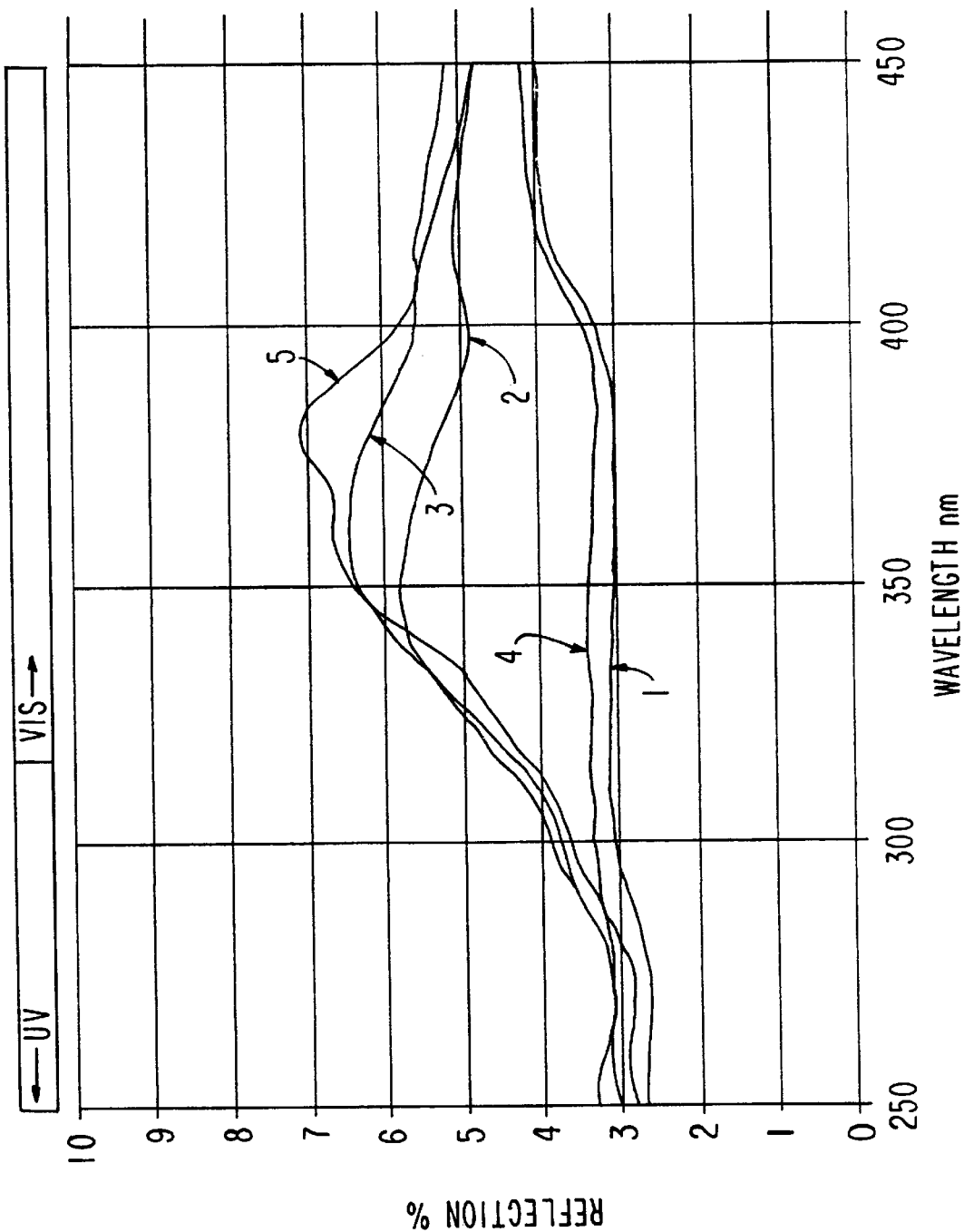

COATING COMPOSITION APPLIED TO A SUBSTRATE AND CONTAINING ULTRA-FINE TIO$_2$ AND METHODS OF MAKING AND USING SAME

This is a continuation-in-part of U.S. patent application Ser. No. 08/268,108, filed Jul. 6, 1994 and now abandoned.

BACKGROUND OF THE INVENTION

The present invention relates to a coating composition which is applied to a substrate and contains ultra-fine Tio$_2$ and to a method for production of the coating composition and to its use.

A coating composition is known from European Patent EP 0 270 472 B1 which contains 24.0 to 35.0% by weight of a thermoplastic or duroplastic resin, 1.1 to 10.5% by weight of a metallic or metallic-like pigment and 1.1 to 10.5% by weight transparent TiO$_2$ which has a particle size of 20 to 30 nm. The coat composition is intended for use as a base coating for a metallic paint for automobile bodies in the automobile industry. At least one layer of an unpigmented varnish is applied to this base paint. Several layers of a pigmented base paint may also be applied. However, the pigmented coating composition is not used as a top coat. In addition to the metallic effect, the coating composition exhibits the frost effect. The frost effect can be noted when observing coating compositions which contain metallic or metallic-like pigments in combination with finely-divided TiO$_2$. The frost effect depends on the direction of incidence of the light relative to the sample and to the observer. If the samples are observed from a vertical direction, the coating seems yellowish to golden in color, but if observed from a horizontal direction, the sample looks bluish.

It can be inferred from the publication by J. G. Balfour in J. Oil Colour Chem. Assoc. (1), 1992, page 21 ff. that in the case of paints which contain exclusively ultra-fine TiO$_2$, the total reflectance of the paints increases with the increase in the pigment volume concentration from 0.1 to 1.0% ultra-fine TiO$_2$. The increase in the reflectance of the paints is greater in the blue light range at a relatively short wavelength. With the increase in ultra-fine TiO$_2$ in the pigment volume concentration, the paints appear to be increasingly milky to the observer.

In conventional coating compositions which are applied to a substrate, an improvement in the total reflectance and depth of color is always desired. An improvement in the unsatisfactory stabilization of colored pigments is likewise always desired. This is particularly so when it is necessary to apply preferably only one coating composition as top coat to a substrate, and therefore the total reflectance and the depth of color only result from the one top coat.

SUMMARY OF THE INVENTION

It is an object of the present invention to provide a coating composition which has a high total reflectance, intensive depth of color and long storage stability, and also good flocculation stabilization of colored pigments.

This object is achieved by a coating composition which comprises 0.5 to 30.0% by volume colored pigment and/or carbon black, with the proviso that it is not a metallic pigment or metallic-like pigment, 55.0 to 98.5% by volume binder solids and 0.3 to 15% by volume ultra-fine TiO$_2$ having a particle size of 5 to 40 nm and has a high total reflectance and intensive depth of color. The crystallite size is determined according to Debye-Scherrer. The crystallite size thus determined is approximately identical to the particle size. The term "coating composition" refers to the hardened coating.

The art definitions of "metallic pigment" and "metallic-like pigment" can be found in the above-mentioned European Patent EP 0 270 472 B1. The term "metallic pigment" means a pigment which actually contains metal as a separate layer, phase or in a suspension and of course has a metallic appearance as a result. On the other hand, the term "metallic-like pigment" means a pigment which has a metallic appearance but does not actually contain metal as a separate layer, phase or in a suspension. An example of the latter metallic-like pigment is a metal oxide coated mica pigment. DIN 55 944 classifies pigments in a similar manner, for example inorganic pigments, "Glanzpigments" (English translation: shiny pigments), are divided into metal effect pigments which actually include metal as a separate phase or layer and other types of pigments including the metal oxide coated mica pigments.

The proportions of the coating composition are given in pigment volume concentration (PVC), and therefore in % by volume or, in simplified manner, in %. The pigment volume concentration designates the proportion by volume of one or more pigments, relative to the total solids volume of the hardened coating.

The ultra-fine Tio$_2$ may be in the form of the crystal modifications rutile, anatase or in X-amorphous form. For reasons of weathering-resistance, a ultra-fine Tio$_2$ in the rutile modification is preferable. Subsequent inorganic and/or organic treatment of the ultra-fine TiO$_2$ has no effect on the suitability thereof in the coating compositions according to the invention. The production process for the ultra-fine TiO$_2$ or the particle morphology of the ultra-fine Tio$_2$ do not impair the action of the ultra-fine TiO$_2$ in the coating composition according to the invention. Ultra-fine TiO$_2$ can therefore be used in coating compositions according to the invention independently of the method of production or particle morphology thereof.

The coating compositions according to the invention have a surprisingly strong blue-tone shift of the respective color. The color does not change with the angle of observation. The color impression is identical for a steep-angled and for a shallow-angled top view of the coatings. This is to be contrasted to the opposite behavior of the metallic pigments of Arima et al, disclosed in U.S. Pat. No. 4,938,274, and the metallic-like pigments of Panush et al disclosed in EP 0 270 472.

The total reflectance of the coating composition according to the invention increases owing to the addition of ultra-fine TiO$_2$ which does not reduce the brightness. This action can be demonstrated by measured reflectance spectra in the UV-VIS range. According to conventional processes, optical brighteners are used in order to shift the reflectance spectra of coatings into the blue range. Theoretical brighteners are blue-colored pigments or blue dyes which are soluble in the medium being used, which absorb long-wave light and thus shift the intensity distribution of the remitted radiation towards the blue range. The great disadvantage of this is however that the total reflectance decreases.

In the coating compositions according to the invention, the blue shift of the reflectance spectra is produced by an additional reflectance in the wave range of the blue color, namely in the range of about 290 to 440 nm.

Surprisingly, blue-colored coating compositions according to the invention can be produced by combining carbon blacks with ultra-fine TiO$_2$. Conventional titanium dioxides in combination with carbon blacks result in coating compositions of grey color.

Coating compositions according to the invention with a surprisingly intensive depth of color and brilliance can be produced with highly-colored blue pigments, such as copper phthalocyanine blue, in combination with ultra-fine $TiO_2$. A combination of these blue pigments with conventional titanium dioxides results in light blue coating compositions having a comparatively greyish-yellowish appearance. If bluish-red pigments are combined with ultra-fine $TiO_2$, the blue tinge of the coating compositions according to the invention is increased, which means that the color magenta with an intensive depth of color is obtained.

With the coating compositions according to the invention, it was surprisingly possible to establish that the ultra-fine $TiO_2$ has a flocculation-stabilizing effect on the colored pigments.

The ultra-fine TiO2 demonstrates a surprisingly great strength, which is manifest when finished coating compositions are not destroyed by photodegradation, even after a long period of application.

According to a preferred feature of the invention at least one colored pigment, selected from blue, red or orange colored pigments, is contained in the coating composition as the colored pigment. Those colored pigments which preferably reflect light in the wavelength range of 400 nm to 550 nm and of 700 nm to 780 nm are designated as blue colored pigments. Those colored pigments which preferably reflect light in the wave range of 600 nm to 680 nm are designated as red colored pigments.

According to a preferred feature of the invention at least one binder selected from the group consisting of alkyd resin, melamine resin, acrylic resin and other resins is contained in the coating composition to provide a binder solids content. The binders may be dispersed in both water and organic solvents. They are also used as dispersions for formulating the coating composition. The binders react physically or chemically with a cross-linking action. According to the invention, multi-constituent reactive resins are also used.

According to a preferred feature of the invention the ultra-fine $TiO_2$ has a specific surface area of 30 to 150 $m^2/g$. For conventional $TiO_2$ having a particle size of 150 to 350 nm (particle size determined by photo-pigments), the specific surface area is 7 to 22 $m^2/g$.

According to another preferred feature of the invention the total pigment volume concentration of all the pigment constituents is from 1.0 to 20.0%. The coating compositions according to the invention show that with a low pigment volume concentration surprisingly a very good coverage is obtained for the total pigment, which makes them particularly suitable as top coats. This can be ascribed to the flocculation-stabilization action of the ultra-fine $TiO_2$ on the other pigmentation constituents.

According to a further preferred feature of the invention the pigment volume concentration for the colored pigment is 0.5 to 15.0%.

One aspect of the invention is a substrate which is coated with a coating composition according to the invention. Suitable substrates are any conventional commercially-available materials which can be coated on their surface with a top coat.

The coating composition according to the invention is produced by dispersion of colored pigment and/or carbon black, binder solids and ultra-fine $TiO_2$ in a solvent in a known manner and that composition is applied to the substrate.

High-speed microelement mixer mills or roller mills and other dispersing apparatus are used for the dispersing. The ultra-fine $TiO_2$ is added to the grinding paste of the colored pigment. Alternatively, a paste of the ultra-fine $TiO_2$ is dispersed and is added to the coating composition. In this case, homogenization of the coating composition according to the invention using a dispersing apparatus with a lesser dispersing action, such as a dissolver, is sufficient.

One aspect of the invention is the use of the coating composition according to the invention as a finishing lacquer for motor vehicles, industrial coating, printing ink, coil coating, package coating, plastic coating and decorative paint, and also as a paint.

A special use of the coating composition according to the invention is in the decorative field, in which coatings with intensive depth of color and brilliance with high total reflectance are required.

BRIEF DESCRIPTION OF THE DRAWING

The objects, features and advantages of the present invention will now be illustrated in more detail by the following detailed description, reference being made to the accompanying drawing in which:

FIG. 1 are reflectance spectra of various coatings in the UV-VIS range in a wavelength range from 190 to 690 nm; and FIG. 2 is a portion of the reflectance spectra shown in FIG. 1 in the wavelength range of 250 to 450 nm.

DESCRIPTION OF THE PREFERRED EMBODIMENTS

The invention will be explained with reference to Examples 1 to 6 and FIGS. 1 and 2. In Examples 1 to 6, coating compositions before application to a substrate are illustrated in tabular form. The dispersed coating compositions, in addition to the constituents according to the invention, contain one or more solvents, which evaporate after application to a substrate. Some dispersed coating compositions additionally contain additives and catalysts. The coating compositions represented have all the constituents present in the coating compositions before application to a substrate. The contents of the constituents of the dispersed coating compositions are therefore given in percent by weight. "Dry substance" (%) defines the percentage of solid of the respective constituent which does not evaporate.

Example 1
Color: blue

| Constituent | | Parts by weight wt. % | Density wet g/cm³ | Density dry g/cm³ | Dry substance % |
|---|---|---|---|---|---|
| Alkyd resin | Alkydal ® F 300[1] | 55.420 | 1.000 | 1.100 | 65.0 |
| Solvent | Xylene | 10.465 | 0.870 | 0.000 | 0.0 |
| Solvent | Solvesso ® 100[10] | 3.223 | 0.950 | 0.000 | 0.0 |
| Melamine resin | Maprenal ® MF 800[2] | 21.832 | 1.100 | 1.100 | 55.0 |
| Gas black | Raven ® 1170[6] | 2.522 | 1.800 | 1.800 | 100.0 |
| $TiO_2$ | ultra fine $TiO_2$[11] | 6.538 | 4.000 | 4.000 | 100.0 |
| | | 100.000 | 1.067 | 1.223 | |

| Pigment | PVC Vol. % | Particle size nm | Specific surface area m²/g |
|---|---|---|---|
| Total | 6.5 | — | — |
| ultra fine $TiO_2$[11] | 3.5 | 20–30[a] | 113.00[a] |
| Carbon black[6] | 3.0 | 24[b] | 120.00[b] |

6,005,044

Example 2
Color: royal blue

| Constituent | | Parts by weight wt. % | Density wet g/cm³ | Density dry g/cm³ | Dry sub-stance % |
|---|---|---|---|---|---|
| Alkydal resin | Alkydal ® F261HS[1] | 60.278 | 1.140 | 1.200 | 79.0 |
| Resin | Cymel ® 301[7] | 12.072 | 1.200 | 1.200 | 98.0 |
| Phthalo-cyanine blue | Heliogen Blue L6989 F[3] | 6.151 | 1.600 | 1.600 | 100.0 |
| TiO₂ | ultra fine TiO₂[11] | 5.492 | 4.000 | 4.000 | 100.0 |
| PTSS | p-toluenesulfonic acid | 0.278 | 0.950 | 1.050 | 50.0 |
| Additive | BYK ® 344[5] | 0.062 | 0.940 | 1.050 | 50.0 |
| Additive | BYK ® 141[5] | 0.124 | 0.890 | 1.000 | 3.0 |
| Solvent | Butanol | 2.233 | 0.800 | 0.000 | 0.0 |
| Solvent | Ethylglycol | 2.106 | 0.930 | 0.000 | 0.0 |
| Solvent | Ethylglycol acetate | 7.694 | 0.970 | 0.000 | 0.0 |
| Solvent | Butyl acetate | 3.510 | 0.890 | 0.000 | 0.0 |
| | | 100.000 | 1.168 | 1.298 | |

| Pigment | PVC Vol.-% | Particle size nm | Specific surface area m²/g |
|---|---|---|---|
| Total | 9.5 | — | — |
| ultra fine TiO₂[11] | 2.5 | 20–30[a] | 113.00[a] |
| Colored pigment[3] | 7.0. | | 44.00[b] |

Example 3
Color: magenta

| Constituent | | Parts by weight wt. % | Density wet g/cm³ | Density dry g/cm³ | Dry sub-stance % |
|---|---|---|---|---|---|
| Alkyd resin | Alkydal ® F300[1] | 52.744 | 1.000 | 1.100 | 65.0 |
| Pigment Red 254 | Cinquasia ®-Red YRT759D[4] | 6.788 | 1.550 | 1.550 | 100.0 |
| Solvent | Solvesso ® 100[10] | 3.067 | 0.950 | 0.000 | 0.0 |
| Solvent | Xylene | 9.959 | 0.870 | 0.000 | 0.0 |
| Melamine resin | Maprenal ® MF800[2] | 20.778 | 1.100 | 1.100 | 55.0 |
| TiO₂ | ultra fine TiO₂[11] | 6.664 | 4.000 | 4.000 | 100.0 |
| | | 100.000 | 1.083 | 1.243 | |

| Pigment | PVC Vol.-% | Particle size nm | Specific surface area m²/g |
|---|---|---|---|
| Total | 12.7 | — | — |
| ultra fine TiO₂[11] | 3.5 | 20–30[a] | 113.00[a] |
| Colored pigment[4] | 9.2 | 50–110[b] | 44.00[b] |

Example 4
Color: magenta

| Constituent | | Parts by weight wt. % | Density wet g/cm³ | Density dry g/cm³ | Dry sub-stance % |
|---|---|---|---|---|---|
| Acrylic resin | Macrynal ® SM510n[2] | 49.402 | 1.000 | 1.100 | 60.0 |
| DBTL | Irgastab ® DBTL[4] | 0.010 | 1.000 | 1.000 | 100.0 |
| Amine | Dimethyl-ethanolamine | 0.141 | 1.000 | 1.000 | 100.0 |
| Silicone oil | Silicone oil L 050[8] | 0.006 | 1.000 | 1.000 | 100.0 |
| Solvent | Solvesso ®100[10] | 3.167 | 0.950 | 0.000 | 0.0 |
| Solvent | Xylene | 4.359 | 0.870 | 0.000 | 0.0 |
| Solvent | Methoxypropyl acetate | 5.100 | 0.900 | 0.000 | 0.0 |
| Pig.Red 202 | Pigment red 202[9] | 2.714 | 1.650 | 1.650 | 100.0 |
| TiO₂ | ultra fine TiO₂[11] | 13.159 | 4.000 | 4.000 | 100.0 |
| Polyiso-cyanate | Desmodur N 75[1] | 21.942 | 1.070 | 1.100 | 75.0 |
| | | 100.000 | 1.123 | 1.322 | |

| Pigment | PVC Vol.-% | Particle size nm | Specific surface area m²/g |
|---|---|---|---|
| Total | 10.5 | — | — |
| ultra fine TiO₂[11] | 7.0 | 20–30[a] | 113.00[a] |
| Colored pigment[9] | 3.5 | | 53.00[c] |

Example 5
Water-based varnish: blue

| Constituent | | Parts by weight wt. % | Density wet g/cm³ | Density dry % | Dry sub-stance |
|---|---|---|---|---|---|
| Alkyd resin | Heso-Alkyd 359 W1[12] | 44.138 | 1.000 | 1.100 | 80.0 |
| Melamine resin | Maprenal ® MF 900[2] | 12.390 | 1.200 | 1.200 | 95.0 |
| Amine | Triethylamine | 4.394 | 0.900 | 0.900 | 100.0 |
| Solvent | Isobutanol | 7.784 | 0.900 | 0.900 | 100.0 |
| Solvent | Water | 19.334 | 1.000 | 0.000 | 0.0 |
| Carbon black | Raven ® 1170[6] | 2.420 | 1.800 | 1.800 | 100.0 |
| Additive | Soligen Zn[13] | 0.502 | 0.900 | 1.000 | 35.0 |
| Additive | BYK ®320[5] | 0.126 | 0.850 | 1.000 | 52.0 |
| Additive | Borchigen ® ND[13] | 0.126 | 1.100 | 1.100 | 100.0 |
| Additive | Nopco ® 8034[14] | 0.628 | 0.920 | 0.920 | 100.0 |
| Solvent | Butylglycol | 2.510 | 0.980 | 0.000 | 0.0 |
| TiO₂ | ultra fine TiO₂ | 5.648 | 3.600 | 3.600 | 100.0 |
| | | 100.000 | 1.180 | 1.231 | |

| Pigment | PVC Vol.-% | Particle size nm | Specific surface area m²/g |
|---|---|---|---|
| Total | 5.7 | — | — |
| ultra fine TiO₂[11] | 3.1 | 20–30[a] | 113.00[a] |
| Carbon black[6] | 2.6 | 24[b] | 120.00[b] |

Example 6
Can coating: blue

| Constituent | | Parts by weight wt. % | Density wet g/cm³ | Density dry % | Dry sub-stance |
|---|---|---|---|---|---|
| Saturated polyester | Dynapol ® LH12[15] | 58.700 | 1.000 | 1.100 | 60.0 |
| Solvent | Solvesso ® 200[10] | 21.290 | 0.990 | 0.000 | 0.0 |
| Catalyst | Vestoritkat. 1203[15] | 2.914 | 0.950 | 1.050 | 50.0 |
| Solvent | Butyldiglycol | 0.953 | 0.950 | 0.000 | 0.0 |
| Resin | Cymel ®303[7] | 9.279 | 1.100 | 1.100 | 100.0 |
| Solvent | Dibasic ester | 2.719 | 0.900 | 0.000 | 0.0 |
| Special carbon black | Special Black 5[16] | 0.698 | 1.800 | 1.800 | 100.0 |
| TiO₂ | ultra fine TiO₂ | 3.447 | 4.000 | 4.000 | 100.0 |
| | | 100.000 | 1.031 | 1.163 | |

-continued

Example 6
Can coating: blue

| Pigment | PVC Vol.-% | Particle size nm | Specific surface area m²/g |
|---|---|---|---|
| Total | 2.9 | — | — |
| ultra fine TiO$_2$[11] | 2.0 | 20–30[a] | 113.00[a] |
| Carbon black[16] | 0.9 | 20[b] | 240.00[b] |

Footnotes for Example 1 to 6:
[a] measured according to Debye-Scherrer
[b] details from manufacturer
[c] measured according to DIN 66 132
List of Manufacturers for Examples 1 to 6:
[1] Bayer AG
[2] Hoechst AG
[3] BASF AG
[4] CIBA-GEIGY AG
[5] BYK Chemie AG
[6] Columbian Chemical
[7] American Cyanamid Co.
[8] Wacker Chemie
[9] Sun Chemical
[10] Texaco AG
[11] Sachtleben Chemie GmbH
[12] Cray Valley
[13] Gebr. Borchers AG
[14] Munzing Chemie
[15] Huls AG
[16] Degussa AG FIG. 1 shows the reflectance spectra of various coatings in the UV-VIS range in the wave range of 190 to 690 nm. The reflectance is measured at the given wavelengths. The reflectance is given on the ordinate in percent. The reflectance measurements are measured with the Ulbrich-Kugel (System: Phillips PU 8800) at a wavelength advance of 1 nms$^{-1}$ with BaSO$_4$ as reference. FIG. 2 shows a section of the reflectance spectra represented in FIG. 1 in the wavelength range of 250 to 450 nm. Samples (1) to (5) are paints having the pigments listed below:

| Vol. -% | | Vol. % | | Sample |
|---|---|---|---|---|
| 3.0 carbon black | | | | (1) |
| 3.0 carbon black | | 3 – 5 Ultrafine | TiO2 | (2) |
| 3.0 carbon black | | + 7.0 Ultrafine | TiO2 | (3) |
| 9.2 Irgazin Red-DPPBO | 4) | + 7.0 Ultrafine | BaSO4 | (4) |
| 9.2 Irgazin Red-DPPBO | 4) | + 3.5 Ultrafine | TiO2 | (5) |

In samples (2), (3) and (5), TiO$_2$ having a particle size of 20 to 30 nm was used. In sample (4), BaSO$_4$ having a particle size of 150 nm to 250 nm was used. Samples (1) and (4) contain no ultra-fine TiO$_2$. The spectra of samples (1) and (4) in FIGS. 1 and 2 do not exhibit any increase in the reflection in the blue range of 300 to 400 nm. Samples (2), (3) and (5) contain ultra-fine TiO$_2$ in different pigment volume concentrations. Samples (2) and (3) differ in the pigment volume concentration of ultra-fine TiO$_2$. Sample (2) contains 3.5% by volume ultra-fine TiO$_2$ and sample (3) contains 7.0% by volume ultra-fine TiO$_2$. As a result of this, sample (3) in the wavelength range of 330 to 400 nm exhibits an increase in reflectance of on average 1%. The reflectance of samples (4) and (5) in the range of red light above 570 nm with a maximum at 650 nm can be ascribed to the red pigment used in these samples.

Samples (4) and (5) differ in that sample (5) contains 3.5% by volume ultra-fine TiO$_2$, whereas sample (4) contains 7% by volume ultra-fine BaSO$_4$. Even in the red range, sample (5) shows an increase in reflectance by 5% compared with sample (4), which is further proof that the total reflectance of the coating compositions according to the invention is increased by the addition of ultra-fine TiO$_2$ which is a surprising result of the present invention. Furthermore, it was surprisingly discovered that when the coating compositions according to the invention are irradiated with a blue light source a fluorescence-like effect is observed.

While it is apparent that the invention herein disclosed is well calculated to fulfill the objects above stated, it will be appreciated that numerous embodiments and modifications may be devised by those skilled in the art, and it is intended that the appended claims cover all such modifications and embodiments as fall within the true spirit and scope of the present invention.

What is claimed is:

1. A coating composition applied to a substrate, said coating composition consisting of 0.5 to 30.0% by volume of at least one pigment member selected from the group consisting of colored pigments and carbon black, with the proviso that said group does not include a metallic pigment or a metallic-like pigment; from 55.0 to 98.5% by volume binder solids; and from 0.3 to 15% by volume of ultra-fine TiO$_2$ having a particle size of 5 to 40 nm.

2. The coating composition as defined in claim 1, wherein said at least one pigment member is selected from the group consisting of blue colored pigments and red colored pigments.

3. The coating composition as defined in claim 1, wherein at least one of said binder solids is selected from the group consisting of alkyd resin, melamine resin and acrylic resin.

4. The coating composition as defined in claim 1, wherein said ultra-fine TiO$_2$ has a specific surface area of 30 to 150 m²/g.

5. The coating composition as defined in claim 1, wherein the total pigment volume concentration of all pigment constituents is from 1.0 to 20.0%.

6. The coating composition as defined in claim 1, wherein said at least one pigment member includes at least one of said colored pigments in a pigment volume concentration of from 0.5 to 15.0%.

7. A method of making the coating composition as defined in claim 1, comprising the steps of dispersing said at least one pigment member, said binder solids and said ultra-fine TiO$_2$ in a solvent to form a dispersion and applying said dispersion to said substrate.

8. A method of painting or finishing a motor vehicle body comprising applying said dispersion of claim 7 to said motor vehicle body as acting as said substrate.

9. A lacquer finish for a motor vehicle comprising the coating composition as defined in claim 1.

10. A printing ink comprising the coating composition as defined in claim 1.

11. A coil coating comprising the coating composition as defined in claim 1.

12. A package coating comprising the coating composition as defined in claim 1.

13. A plastic coating comprising the coating composition as defined in claim 1.

14. A decorative paint comprising the coating composition as defined in claim 1.

15. A dispersed coating composition consisting of 0.3 to 15% by volume of ultra-fine titanium dioxide having a particle size of 5 to 40 nm; 0.5 to 30.0% by volume of at least one pigment member selected from the group consisting of colored pigments and carbon black; from 55.0 to 98% by volume binder solids; and at least one volatile solvent;

wherein the dispersed composition does not contain any metallic pigment or metallic-like pigment and the % by volume above are based on a total weight of said composition without said at least one solvent.

16. A coating composition made by applying the dispersed coating composition of claim 15 to a substrate and allowing said at least one volatile solvent to evaporate.

17. A blue coating composition applied to a substrate, said blue coating composition consisting of 0.5 to 15.0% by volume of carbon black; from 0.3 to 15% by volume of ultra-fine $TiO_2$ having a particle size of 5 to 40 nm; from 55.0 to 98.5% by volume binder solids and not including a metallic pigment or a metallic-like pigment.

* * * * *

UNITED STATES PATENT AND TRADEMARK OFFICE
CERTIFICATE OF CORRECTION

PATENT NO. : 6,005,044
DATED : DECEMBER 21, 1999
INVENTOR(S) : KARL, W. ET AL

It is certified that error appears in the above-identified patent and that said Letters Patent are hereby corrected as shown below:

The priority application serial number is corrected to read 43 23 372,

Signed and Sealed this

Twenty-fourth Day of April, 2001

Attest:

NICHOLAS P. GODICI

Attesting Officer

Acting Director of the United States Patent and Trademark Office